(No Model.)

A. GEYER.
Method of Making Glass Nipple Shields for Nursing Purposes.

No. 235,522.          Patented Dec. 14, 1880.

Witnesses.
Henry Chadbourn.
Ed. C. Torrey

Inventor.
Andrew Geyer.
by Elban Andrew
his att:

UNITED STATES PATENT OFFICE.

ANDREW GEYER, OF EAST CAMBRIDGE, MASSACHUSETTS.

METHOD OF MAKING GLASS NIPPLE-SHIELDS FOR NURSING PURPOSES.

SPECIFICATION forming part of Letters Patent No. 235,522, dated December 14, 1880.

Application filed September 27, 1880. (No model.)

*To all whom it may concern:*

Be it known that I, ANDREW GEYER, a citizen of the United States, residing at East Cambridge, in the county of Middlesex and State of Massachusetts, have invented certain new and useful Improvements in Methods of of Making Glass Nipple-Shields for Nursing Purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a new and useful method of making glass nipple-shields for nursing purposes; and it consists, first, in pressing the glass within male and female molds, the female mold having a cup-shaped recess corresponding to the exterior surface of the nipple-shield and a central cylindrical recess corresponding to the exterior surface of the tubular projection on the shield, to which the rubber tube or nipple is usually attached, the male mold or plunger consisting of a conically-shaped bar, from the bottom of which projects downward a steel rod, that serves as a core for the formation of the central recess in the tubular projection aforesaid. The said central steel core is, however, made somewhat shorter than the cylindrical recess in the bottom of the female mold, so that the nipple-shield, when pressed in the molds, is made solid in the lower part of the tubular projection, such solidity being equal to the difference in length between the cylindrical recess in the bottom of the female mold and the steel core in the end of the plunger or male mold. The said solid portion of the tubular projection is subsequently removed, preferably by means of a rotary grindstone, after the pressed nipple-shield is annealed and properly cooled. By this method of first pressing between molds a nipple-shield having a solid portion in the end of its hollow tubular projection and afterward removing such solid part, so as to provide a perforation through the said tubular projection, I am able to press such a shield without the liability of cracking its lower part, which would be the case if no such solid portion were left.

Nipple-shields as made by this method can be made of a uniform and standard size and shape, much neater and cheaper than the ordinary ones that are now being made by the process designated "lamp-work."

Figure 1:
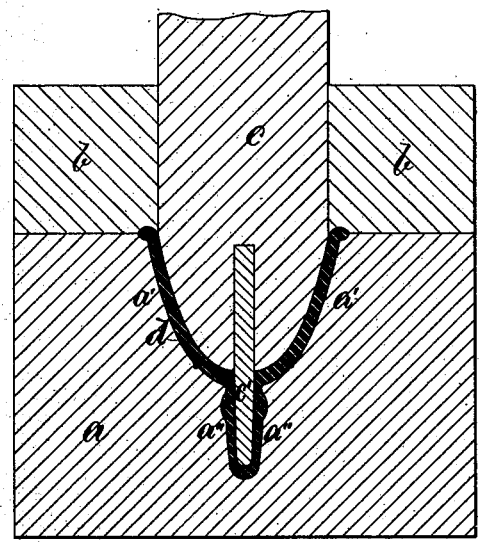
Figure 2:
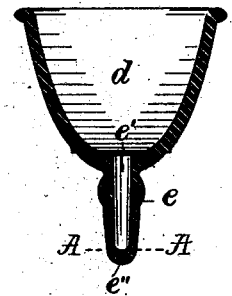
Figure 3:
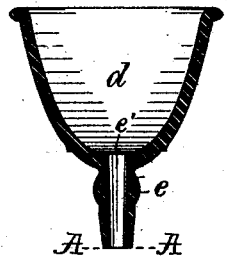

On the accompanying drawings, Figure 1 represents a section of the nipple-shield and its male and female molds. Fig. 2 represents, in section, a nipple-shield in the condition in which it is taken from the molds; and Fig. 3 represents, in section, a finished nipple-shield.

Similar letters refer to similar parts wherever they occur on the different parts of the drawings.

*a* represents the female mold, having conical recess *a'* and cylindrical recess *a''*, as and for the purpose described.

*b* represents the cap-plate of the molds, as usual.

*c* represents the male mold or plunger, and *c'* represents its downward-projecting steel core, as and for the purpose set forth.

*d* represents the pressed nipple-shield, and *e* represents its tubular projection with its interior perforation, *e'*, as described.

*e''* represents the solid portion at the bottom of the tubular projection, which is afterward ground off or otherwise removed as far as the line marked A A in Figs. 2 and 3, by which means an opening is made through the lower part of the tubular projection *e*, as fully represented in Fig. 3.

Glass chimneys for lamps have been pressed in a mold with a closed end and a circumferential groove near the same, the chimney being then removed from the mold and the closed end broken off at the circumferential groove, the end of the chimney being then finished up; but such is not my invention, and is therefore disclaimed.

Having thus fully described the nature and operation of my invention, I wish to secure by Letters Patent and claim—

The method herein described of making glass nipple-shields for nursing purposes, the same consisting in subjecting the glass within a mold to the action of a conical former, having a reduced cylindrical stem for simultaneously forming the cup shape to the shield, and the reduced tubular projection with a solid portion at its end, and finally removing the shield and grinding off the said solid end portion, all substantially as and for the purpose described.

In testimony whereof I have affixed my signature in presence of two witnesses.

ANDREW GEYER.

Witnesses:
 ALBAN ANDRÉN,
 EPES LAYWARD, Jr.